United States Patent [19]

Dallons et al.

[11] 4,329,989
[45] May 18, 1982

[54] LIQUID DISPENSER

[75] Inventors: Robert E. Dallons, Agoura; William S. Fortune, Malibu, both of Calif.

[73] Assignee: Edsyn, Inc., Van Nuys, Calif.

[21] Appl. No.: 237,219

[22] Filed: Feb. 23, 1981

[51] Int. Cl.³ ............................................. A61M 5/00
[52] U.S. Cl. ................................. 128/218 R; 128/221
[58] Field of Search ............... 128/218 R, 218 N, 221, 128/215, 216, 220, 214 R, 348

[56] References Cited

U.S. PATENT DOCUMENTS

| | | | |
|---|---|---|---|
| 145,217 | 12/1873 | Leiter | 128/221 |
| 3,405,713 | 10/1968 | Solowey | 128/221 |
| 3,734,095 | 5/1973 | Santomieri | 128/221 X |

Primary Examiner—John D. Yasko
Attorney, Agent, or Firm—Daniel T. Anderson

[57] ABSTRACT

A liquid dispenser includes a conventional syringe of the type having a piston, a piston rod, an actuating knob disposed in a cylinder, and a needle extending from the cylinder. The invention consists of a needle assembly therefor which includes a cap, a sleeve slidable on the needle and a retainer cap interconnecting the two. The cap is used for closing the needle to preserve the liquid and prevent spillage. The needle is provided with an inner coupler which may consist of two slightly spaced beads fixed to the needle near the end thereof. There is also provided an outer coupler into which may be fitted an extension tube by means of another inner coupler of the same construction as the first one. The inner coupler may be so mounted on the needle that its extension tube is housed in the inner needle, or it may be reversed so that the extension tube extends from the inner needle to extend the point at which the liquid is dispensed.

8 Claims, 7 Drawing Figures

U.S. Patent
May 18, 1982
4,329,989
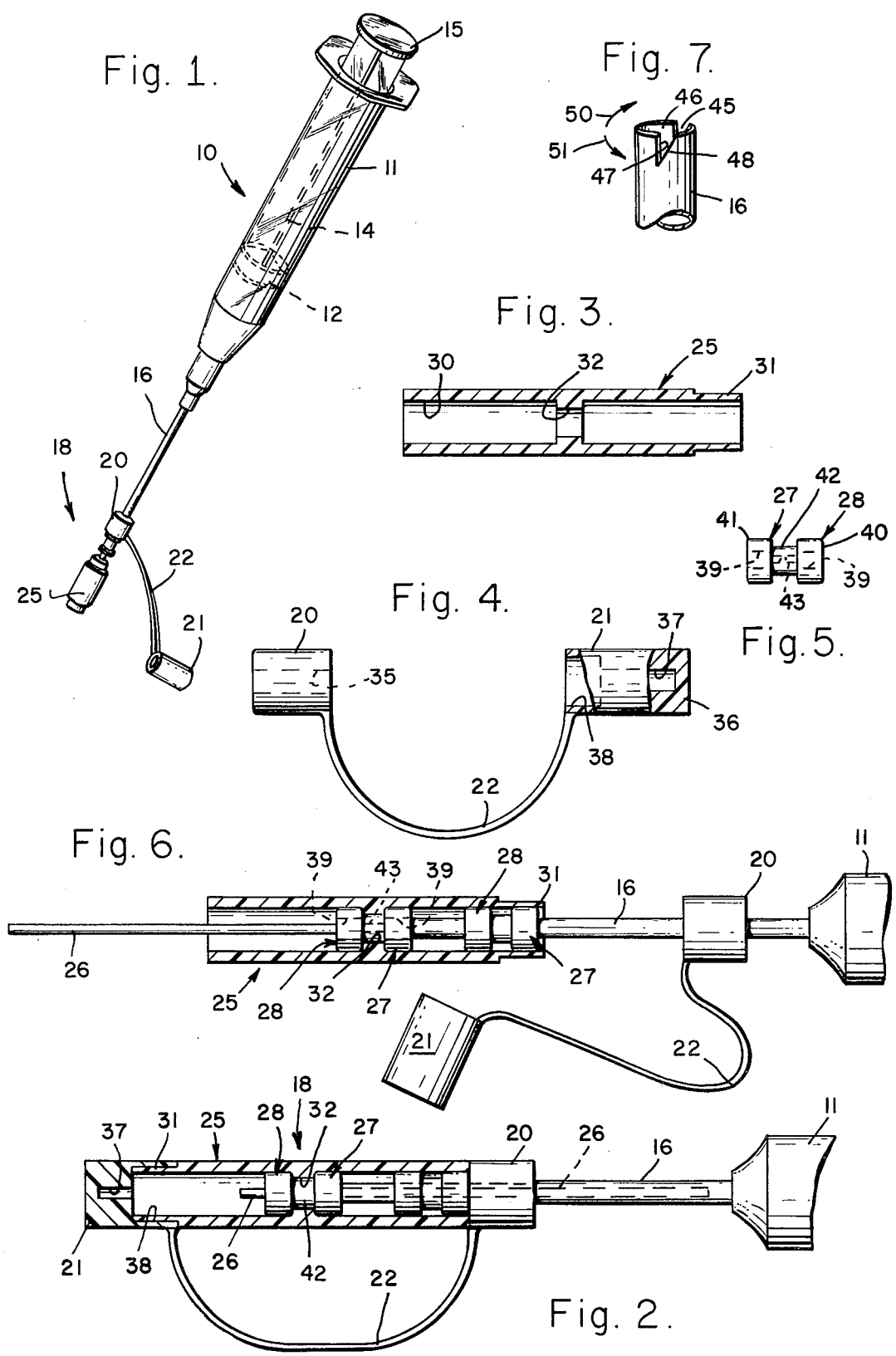

LIQUID DISPENSER

BACKGROUND OF THE INVENTION

This invention relates generally to a liquid dispenser and more particularly to one which includes a conventional syringe and a needle assembly for precisely metering a small amount of liquid.

Since the liquid dispenser of the invention includes a syringe, means must be provided to prevent its unauthorized use for injecting drugs and the like. Also, in many cases it is desirable to apply the liquid to a point which may be hard to reach with the length of the needle of a conventional syringe. Therefore, means should be provided to extend the reach of the needle.

In view of the use to be made of the liquid dispenser, it will be evident that it should be made as inexpensively as possible.

It is accordingly an object of the present invention to provide a liquid dispenser including a conventional syringe modified in such a way that it cannot be used for injecting drugs or the like into the human skin or a vein.

Another object of the present invention is to provide such a liquid dispenser which may be closed, both to prevent spilling of the liquid, to prevent its contamination, and to maintain the liquid fresh.

A further object of the present invention is to provide such a liquid dispenser with means for extending the reach of the needle of the syringe in such a manner that the extension means can normally be carried with the rest of the instrument.

SUMMARY OF THE INVENTION

In accordance with the present invention, use is made of a conventional syringe of the type which includes a hollow cylinder, a piston in the cylinder, an actuating rod connected to the piston for operating it, and a blunt needle connected to the cylinder for dispensing a liquid contained in the cylinder.

In accordance with the present invention, there is provided a needle assembly which includes a stop means near the free end of the needle. The stop means may, for example, consist of a pair of spaced beads secured to the needle.

There is further provided a cap and a retainer sleeve, which latter slides over the needle between the stop means and the cylinder. Cap and sleeve are connected together by a retainer strap. The cap, in turn, closes the free end of the needle.

Preferably the needle assembly further comprises an extension tube which has an outer diameter small enough to pass through the needle and another stop means on the extension tube close to one end thereof and also extending therefrom.

Finally, an outer coupling element is provided which is hollow, to fit over the needle and its stop means. The outer coupling element bears the exension tube which is fastened thereto by means of its beads.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWING

FIG. 1 is a view in perspective of a liquid dispenser including a syringe and a needle assembly, illustrating one embodiment of the present invention;

FIG. 2 is an enlarged sectional view of the needle assembly, together with the needle of the syringe;

FIG. 3 is a sectional view illustrating the outer coupler and its construction;

FIG. 4 is a plan view partly in section, showing the cap, retainer sleeve and retainer strap;

FIG. 5 is a plan view of the stop means which may, for example, consist of a pair of spaced beads;

FIG. 6 is a sectional view of the needle assembly arranged to cause the extension tube to extend from the assembly, with the cap and retainer strap freely suspended from the sleeve on the needle; and FIG. 7 is an elevational view on greatly enlarged scale of the end of either the needle or the extension tube provided with two opposite cuts to serve as a drill or reamer.

DESCRIPTION OF THE PREFERRED EMBODIMENT

FIG. 1 illustrates, by way of example, the liquid dispenser 10 of the invention. The dispenser includes a conventional syringe having a cylinder 11 in which is disposed a piston 12 and an actuating rod 14 connected to the piston 12, which may be operated by an actuator 15 extending from the cylinder 11. Extending from the opposite end of the cylinder 11 is a needle 16 having a blunt end.

Attached to the needle 16 is a needle assembly 18 which exemplifies, by way of example, the present invention.

The needle assembly 18 includes a retainer sleeve 20, a cap 21 for closing the end of the needle 16, and a retainer strap 22 interconnecting the cap and sleeve. The needle assembly further includes an outer coupler 25. The detailed construction of the needle assembly will now be explained in more detail in connection with FIGS. 2 through 5, to which reference is now made.

Thus, FIG. 2 illustrates on enlarged scale the needle assembly 18, as well as the retainer sleeve 20, retainer cap 21, and retainer strap 22. There is further shown the outer coupler 25, as well as the needle 16 and an extension tube 26. The needle 16 is provided with a stop means 27, illustrated in detail in FIG. 5.

An inner coupler 28 is secured to the extension tube 26 for connecting it to the end of the needle 16. The extension tube 26 is rigidly fastened to the inner coupler 28 near one end thereof. As explained below, this assembly may be axially reversed to provide either a long or a short extension. In FIG. 2, the short arrangement is shown with the long end inserted back, inside of the needle 16 toward the cylinder 11. It will also be clear, from a following description, that the outer coupler 25 is also a rigid part of this subassembly.

Referring now to FIG. 3, there is shown the outer coupler 25 in detail. The outer coupler 25 has an inner diameter 30 which will fit over the inner coupler 28 and the stop means 27. It has an outer reduced diameter, as shown at 31, so that the cap 21 will fit thereover. This will be subsequently explained in connection with FIG. 4. Finally, the outer coupler 25 has an inner diameter 32 smaller than diameter 30 and sufficient to lock the inner coupler 28.

FIG. 4, to which reference is now made, shows the cap 21, retainer sleeve 20, and retainer strap 22 in detail. The retainer sleeve 20 has an inner diameter 35 which is such that it will slide over the needle 16. The strap 22 consists of a flexible material and interconnects the sleeve 20 with the cap 21. The cap 21 has a closed end portion 36 and an inner diameter 37 which will fit over the end of the needle 16. It has an enlarged diameter 38 which is sufficient to fit over the forward end of the outer coupler 25, all as shown in FIG. 2.

The stop means 27 is shown in FIG. 5. It consists of two beads 40, 41, interconnected by a portion 42 having a reduced outer diameter and having a length which may be less than that of each of the beads 40, 41. The stop means 27 has an inner diameter 43 to fit over the needle 16, or over the extension tube 26. The inner coupler 28 may have the same construction as the stop means 27. On the other hand, the inner coupler 28 may have an enlarged diameter portion 39 to fit partially over the needle 16 of larger diameter than for needle 26 to have a better fit.

The stop means 27 and inner coupler 28 may be compressed or swaged at it middle portion 42 to form a snug fit with their respective needles 16 or 26. In this case the two inner couplers may have identical inner diameters 43.

The construction and operation of the needle assembly of the invention will now be evident. It is shown particularly in FIG. 2. The stop means or spaced beads 27 is rigidly secured to the needle 16 near its open end. The stop means 27 may consist of a suitable metal, such as, for example, aluminum. It may simply be secured to the needle 16 by slightly compressing it therein.

The sleeve 20 rides over the needle 16 and is limited in its movement both by the cylinder 11 of the syringe and the stop means 27. The retainer cap 21 with its inner diameter portion 38 fits over the reduced diameter 31 of the outer coupler 25. The bore 37 may fit over the end of the needle 16.

It will be noted that when the liquid dispenser of the invention is in the position shown in FIG. 2, the cap 21 will seal the outer coupler 25 and hence the liquid in the syringe 10. When the outer coupler 26 and its extension tube 26 are removed, the inner diameter portion 37 of the cap 21 will directly close the needle 16.

The outer coupler may consist of low density or high density polyethylene or of polypropylene. The retainer sleeve 20, retainer cap 21 and retainer strap 22 may also consist of low density polyethylene. Accordingly, the outer coupler 25 is somewhat flexible. The extension tube 26 carried by its inner coupler 28, may simply be forced into the outer coupler until the reduced diameter portion 42 moves into the reduced inner diameter 32 of the outer coupler. However, once seated, it may not be possible to remove the inner coupler from the outer coupler.

FIG. 6 illustrates the needle assembly of the invention in its extended form. To this end, the outer coupler 25, which carries the inner coupler 28 and the extension tube 26, is simply removed by first removing the retainer cap 21 and inverted or reversed so that the longer end of the inner tube 26 extends therefrom. The outer coupler is then replaced with the short end of its extension tube 26 within the needle 16.

Accordingly, the subassembly consisting of extension tube 26, inner coupler 28, and outer coupler 25 may be affixed to the end of the needle 16 and the stop means 27 in either of two positions (cf. FIG. 2 or FIG. 6); or it may be left off entirely. In the latter case, note that the cap 21 will fit directly over the end of the needle 16 to seal it.

In the position of FIG. 6, the needle assembly is made much longer, which permits a longer reach of the liquid dispenser, to reach otherwise inaccessible parts. As shown in FIG. 6, the retainer cap 21 is simply left hanging from its strap, while the sleeve 20 may be pushed back from the remaining needle assembly.

It will be realized that the instrument may be used for dispensing grease, oil, flux, or many other liquids. An exact amount of the liquid may be dispensed to a precise spot.

The retainer cap 21, in the position shown in FIG. 6, may be used for hanging the entire liquid dispenser up on a rack or the like. In this case, the syringe 10 will hang downwards, thus preventing spillage of the liquid. Also, the extension tube 26 may be utilized for straightening out leads or electric components, such as DIP components.

It is also feasible to utilize either the needle 16 or the extension tube 26 as a drill or reamer. This has been shown in FIG. 7, to which reference is now made. The end of the tube 16 or 26 may be provided with two opposite slits or cuts, 45 and 46. Each of the cuts has one edge 47 which is substantially parallel to the central axis of the tube. The other wall or edge 48 forms an acute angle with the first edge 47. The two walls 47, 48 are parallel to each other in each cut 45 and 46, as viewed in FIG. 7. Hence, by rotating the tube 16 alternately in the direction of arrows 50 or 51, the inclined edges 48 can be used for drilling or reaming purposes. Thus, for example, they may be used for removing solder which may have been left over in the circular openings in a circuit board carrying electronic components.

It will thus be seen that the liquid dispenser of the invention cannot be used for injecting drugs or the like, because of its blunt end, and the inner coupler disposed near its open end. The inner coupler also acts as a stop for the retainer sleeve. The retainer cap closes the needle or the outer coupler, thus preventing spilling of any liquid, and at the same time keeping the liquid fresh. Besides closing the instrument, the cap may be used for hanging up the instrument. The extension tube may be reversed, thus providing a longer reach for the instrument. Since most of the parts; that is, the outer coupler, the retainer cap, strap, and sleeve, consist of molded parts, they are very inexpensive, as is the inner coupler. The liquid dispenser delivers a precisely controlled small amount of liquid to a precise spot. The needle or extension tube may additionally be used to straighten out the leads of electronic components, as for example DIP components, and may be used as a miniature drill or reamer to remove solder from the holes in a circuit board.

What is claimed is:

1. In combination with a syringe of the type including a hollow cylinder, a piston in said cylinder, an actuating rod connected to said piston for operating it, and a blunt needle connected to said cylinder for dispensing a liquid in said cylinder;

a needle assembly comprising:
(a) a stop means near the free end of said needle and extending radially therefrom;
(b) a cap, retainer strap and retainer sleeve, said retainer sleeve having such an inner diameter as to freely ride over said needle between said stop means and said cylinder, said retainer strap interconnecting said retainer sleeve and said cap, and said cap having an opening to fit over said stop means and a bore extending into said opening, said bore being of such a diameter as to fit over the free end of said needle, and said cap having a closed end portion, whereby said cap is capable of sealing the free end of said needle and containing a liquid in said cylinder.

2. The combination defined in claim 1 wherein said needle assembly further comprises:

an extension tube having an outer diameter sufficiently small to pass through said blunt needle, and an inner coupling element on said extension tube close to one end thereof and extending therefrom.

3. The combination defined in claim 2 wherein said stop means on said needle and said inner coupling element extension tube each consists of two spaced bead-like elements, the interconnecting portion between said beads having a diameter slightly larger than that of said needle.

4. The combination defined in claim 2 wherein an outer coupling element is provided, said outer coupling element being hollow to fit over said needle and stop means thereof and said outer coupling element having means for retaining said inner coupling element on said extension tube.

5. The combination defined in claim 4 wherein said outer coupling element is flexible and has an inner portion of reduced diameter for retaining the portion between the beads on said extension tube, and said outer coupling element having an inner diameter to fit over said beads on said needle.

6. The combination defined in claim 5 wherein said outer coupling element has an end portion of reduced outer diameter to pass over the opening of said cap.

7. The combination defined in claim 2 wherein the free end of said extension tube, or of said needle, adjacent its respective stop means and inner coupling element is provided with two opposed cuts, each of said cuts having a first edge substantially parallel to the axis of said extension tube and a second edge forming an acute angle with said first edge, whereby said extension tube and needle are usable for drilling or reaming purposes.

8. In combination with a syringe of the type including a hollow cylinder, a piston in said cylinder, an actuating rod connected to said piston for operating it, and a blunt needle connected to said cylinder for dispensing a liquid in said cylinder;

a needle assembly comprising:
(a) two spaced bead-like elements forming a stop means disposed near the free end of said needle and extending radially therefrom;
(b) a cap, retainer strap and retainer sleeve, said retainer sleeve having an outer diameter such as to freely ride over said needle between said stop means and said cylinder, said retainer strap interconnecting said retainer sleeve and said cap, said cap having an opening to fit over said stop means and a bore extending into said opening, said bore being of such a diameter as to fit over the free end of said needle, and said cap having a closed end portion;
(c) an extension tube having an outer diameter so as to pass through said needle;
(d) two spaced bead-like elements forming an inner coupling element disposed near one end of said extension tube; and
(e) an outer coupling element having an inner diameter to fit over said bead-like elements on said needle, said inner coupling element having a portion of reduced diameter and of a length to fit the space between said beads on said extension tube, said outer coupling element being sufficiently flexible and yieldable to receive the beads of said extension tube and said inner coupling element having an end portion with a reduced outer diameter to fit the inner diameter of said cap, whereby said extension tube may be removed from said needle and reversed in direction so that said extension tube extends beyond said needle.

* * * * *